United States Patent Office

3,366,947
Patented Jan. 30, 1968

3,366,947

NON-LINEAR PCM DECODER

Masao Kawashima and Shigehiko Hinoshita, Yokohama-shi, Japan, assignors to Fujitsu Limited, Kawasaki, Japan, a corporation of Japan Continuation-in-part of application Ser. No. 253,231, Jan. 22, 1963. This application Jan. 8, 1964, Ser. No. 336,522
4 Claims. (Cl. 340—347)

ABSTRACT OF THE DISCLOSURE

Two groups of parallel-connected resistances have values in geometric order and form groups of parallel branches. Each branch of one group corresponds to a branch in the other and to a respective bit in a PCM code group. A circuit connects a pair of series resistors and the groups of parallel branches in series across a constant voltage source to form a voltage divider having an output terminal between the two groups of parallel branches. Switches are provided in each parallel branch. A series-to-parallel PCM input oppositely switches both switches of each pair of switches in corresponding branches of each group of parallel branches depending upon the respective code values of the bit in a pulse-code-modulated group.

This is a continuation-in-part of our application Ser. No. 253,231, filed Jan. 22, 1963, and now abandoned.

Our invention relates to non-linear encoders and decoders for signal modulation in communication systems.

In a more particular aspect our invention relates to expanding digital-to-analog decoders for compressed pulse-code-modulated (PCM) signals in telephone transmission systems. In such systems a signal compressor at the sending end of the system provides non-linear compression coding, thereby reducing quantum noise that accompanies pulse-code-modulation and increasing the dynamic range of signal transmission, and an expander at the receiving side reestablishes the original linear transmission characteristic.

These compressors and expanders, or compandors, are usually composed of non-linear elements such as conventional diode pairs. However, compandors constructed as a resistance switching network would facilitate adjusting the operating characteristics of the signal compressor and expander, and would also improve the system stability against changes in temperature or other causes of unstable performance.

Thus it is an object of our invention to provide a non-linear expanding decoder composed of resistance elements.

It is another object of this invention to provide a non-linear expanding decoder using resistance switching networks and having symmetrical expansion characteristics.

Another object of the invention is to provide a compandor system wherein the selection of compression characteristics may be effected merely by changing the value of one element, for example a resistance.

Still another object of the invention is to provide a compandor circuit using simple and readily available parts and having simple reliable construction.

The various novel features of our invention are pointed out in the claims forming a part of this specification. Other objects and advantages of our invention will become obvious from the following detailed description when read in the light of the accompanying drawing, wherein:

Figure 1:
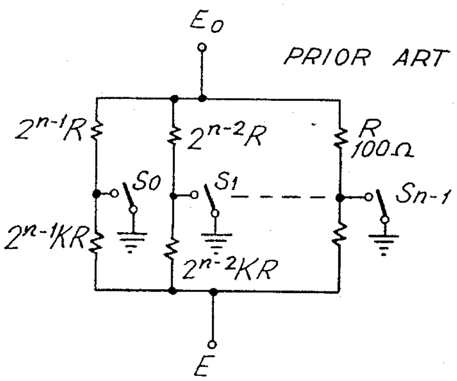
FIG. 1 is a schematic diagram of a known non-linear, hyperbolic, decoding circuit.

FIG. 1 illustrates a known digital-to-analog expanding decoder. Here a constant voltage $E_0$ between a terminal (also designated $E_0$) and ground connects directly to a plurality of resistors designated by their relative values $2^{n-1}R$, $2^{n-2}R$ . . . R. Each of the resistors connects at its other end to respective resistors $2^{n-1}KR$, $2^{n-2}KR$ . . . KR. The junctions of these respective groups of resistors connect respectively to ground by virtue of respective switches $S_0$, $S_1$ . . . $S_{n-1}$. The last-mentioned group of resistors connect at their other ends to a terminal E representing the decoded and expanded output voltage E. The switches $S_0$, $S_1$ . . . $S_{n-1}$ are actuated respectively by the successive digits of a PCM coded input signal having $n$ digits.

Each PCM code group of $n$ digits has a value A out of a total value T which can be carried by $n$ digits. Thus $$\frac{A}{T}=X=\left(\sum_{h=0}^{n-1} A_h \cdot 2^h\right)/(2^n-1)$$

wherein $A_h$ equals 0 or 1 and $0 \leq X \leq 1$. When the values $A_h$ are 0, the corresponding switches $S_h$ are on. When the values $A_h$ are 1, the switches $S_h$ are off.

Figure 2:
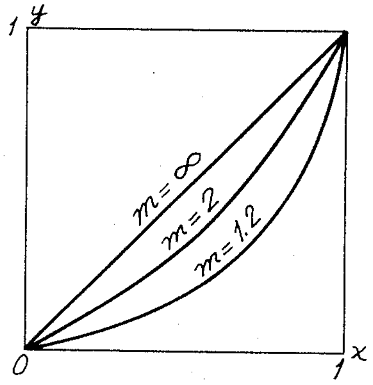
FIG. 2 is a coordinate diagram of the input and output characteristics of the circuit in FIG. 1.

In FIG. 1 the expanded analog output $Y=E/E_0$, where $0 \leq Y \leq 1$, has a value relative to X, and hence an input-output characteristic according to the following equation:

$$Y=\frac{(m-1)X}{m-X} \qquad (1)$$

wherein $m=R+1$, $(m>1)$ is a parameter representing the expansion determined by the circuit of FIG. 1. The characteristic is shown in FIG. 2. This characteristic only expands the values A and X as they increase.

However, a symmetrical expansion characteristic about a median value between 0 and T often is desired. One way to accomplish this would be to duplicate the circuit of FIG. 1 with another circuit of reversed polarity, or to change the polarity of the D.C. power supply, or to use other means responsive to the input of $$-1 \leq X \leq 0$$

where $X=0$ is at ½T and $$X=Z\left(\frac{A}{T}-\frac{1}{2}\right)$$

Figure 3:
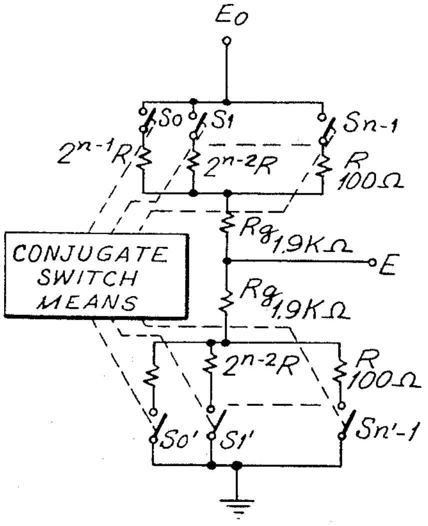
FIG. 3 is a block diagram of a non-linear decoding circuit according to the present invention.

Our invention facilitates obtaining the required symmetrical expansion characteristic. As a feature of the invention, we operate respective switch pairs conjugately according to the respective digits in a PCM input code and indicate our output by a rational function, the denominator of which is a quadratic form of the input. Details of the function are mentioned below with respect to FIGS. 3 and 5 which both illustrate an example of a circuit embodying features of the invention. FIG. 3 is a block diagram and FIG. 5 a detailed schematic of the same circuit.

In the present disclosure, operation of switches "conjugately" or "conjugately switching" is intended to be defined as opposite complementary switching. This may be illustrated by two groups of switches $S_0$, $S_1$ . . . $S_{n-1}$ and $S_0'$, $S_1'$ . . . $S_{n-1}'$, of which the switches of the same subscript correspond to each other. When the switch $S_0$ is ON, the switch $S_0'$ is OFF and vice versa. When the switch $S_1$ is ON, the switch $S_1'$ is OFF and vice versa. When the switch $S_2$ is ON, the switch $S_2'$ is OFF and vice versa. When the switch $S_{n-1}$ is ON, the switch $S_{n-1}'$ is OFF and vice versa, and so on. The switches corresponding to each pair of switches thus operate in opposite complementary fashion.

Figure 5:
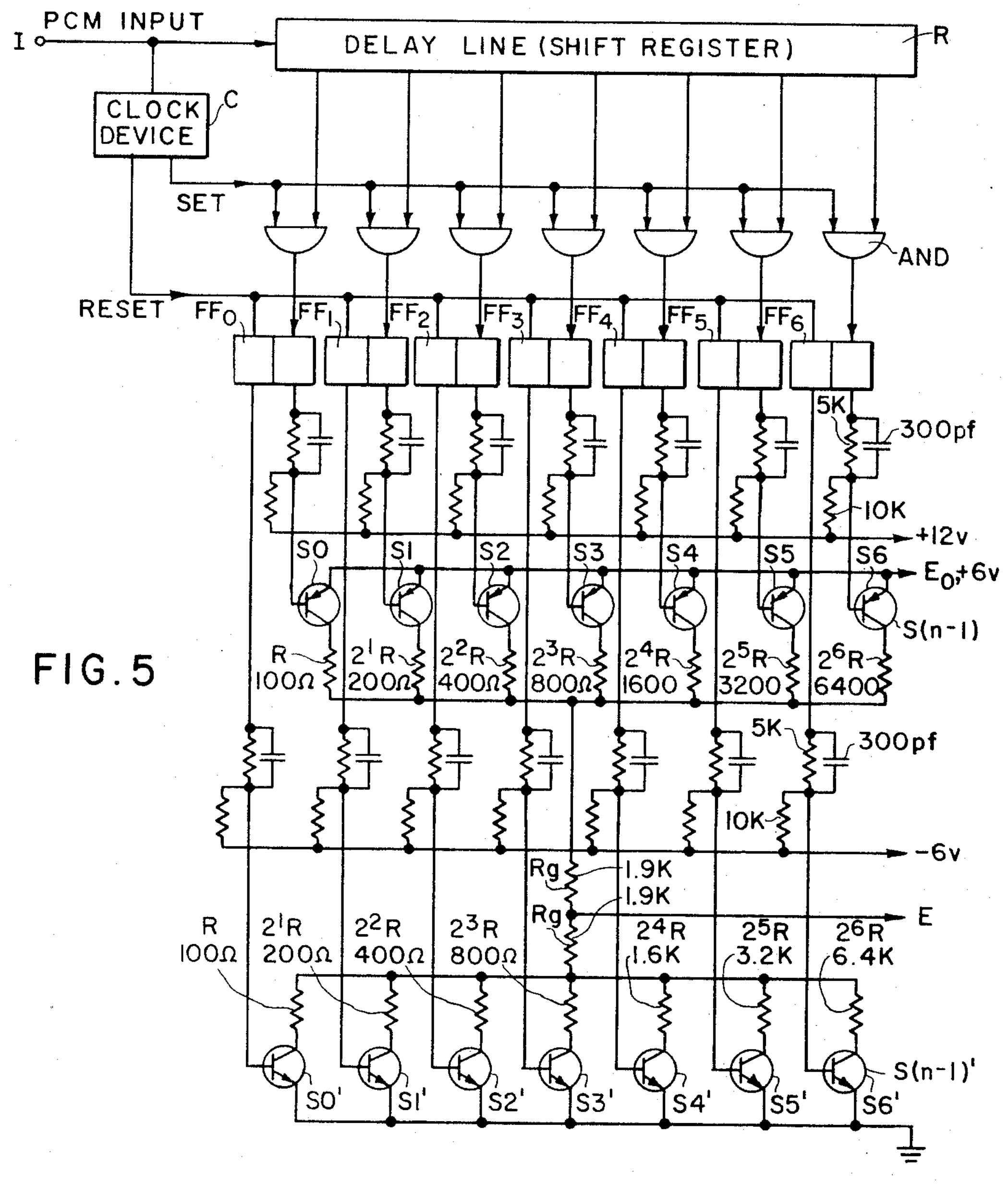
FIG. 5 is a schematic circuit diagram of the non-linear decoding circuit embodying features of the invention and shown in FIG. 3.

In FIG. 5 a received quantized and compressed PCM input signal having 7 digits per code group passes from an input terminal I to a delay line or shift register R having 7 output taps $t_0$ to $t_6$ time-spaced from each other according to the digital spacing of the PCM code bits. The code bits of each group are thus made simultaneous at the output taps. Each tap connects to one input of respective AND gates $A_0$ to $A_6$.

The input signal also passes to a clock device C which produces one set pulse for each code group (7 bits) in unison with the time that the last digit in each code group reaches the first tap $t_0$ and the first AND gate $A_0$, and hence in unison with the time that the respective binary digits in each code group reach their respective taps $t_0$ to $t_6$ (and gates $A_0$ to $A_6$). The set pulse opens the gates $A_0$ to $A_6$ for the duration of one digit and hence permits them to pass the respective now-simultaneous code bits to respective flip-flops $FF_0$ to $FF_6$ which have been reset previously to one condition by another pulse from clock device C. Depending upon whether each digit (bit) of the code group is a mark or a space the flip-flops $FF_0$ to $FF_6$ will remain in that condition or flip over. The flipped-over ones of the flip-flops $FF_0$ to $FF_6$ then render conductive the respective transistor switches $S_0$ to $S_6$ to those bases they are connected. The flip-flops which have remained in their reset condition due to presence of a space render conductive those transistor switches $S_0'$ to $S_6'$ to whose bases they are connected.

The emitter-collector paths of the transistors $S_0$ to $S_6$ each connect a respective resistor R to $2^6$R, having respective values of 100 ohms, 200 ohms, 400 ohms, 800 ohms, 1.6 kilohms, 3.2 kilohms, and 6.4 kilohms, between a common +6-volt source $E_0$ and a common 1.9 kilohms resistor R*g*. Similarly the emitter-collector paths of respective transistors $S_0'$ to $S_6'$ connect seven resistors R to $2^6$R, having respective values 100 ohms, 200 ohms, 400 ohms, 800 ohms, 1.6 kilohms, 3.2 kilohms, and 6.4 kilohms, between a common ground and a common 1.9 kilohms resistor R*g*'. The resistors R*g* and R*g*' connect together to form an output terminal E whose median voltage level is approximately 3 volts.

In operation, the sequential digits (bits) in the PCM code groups (series PCM) pass through the shift register which, together with clock device C, renders them simultaneous (parallel PCM) so that they now can simultaneously control seven flip-flops $FF_0$ to $FF_6$. These open or close the switches $S_0$ to $S_6$ and $S_0'$ to $S_6'$ conjugately so that a voltage divider is established between the 6-volt point $E_0$ and ground, with a mid-point E and constituent resistances whose total values depend upon the code input. The flip-flops retain the output at E until the end of the next code group since without a new set pulse the signals from the shift register are unable to affect the respective conditions of flip-flops $FF_0$ to $FF_6$. Thus for each digital, binary, PCM input value A, there exists an analog output value E symmetrically from a median output value $E_0/2$. Thus, if $$X=2\left(\frac{A}{T}-\tfrac{1}{2}\right) \text{ and } A=\sum_{r=0}^{n-1} A_r 2^r$$

$$X=2\left[\frac{\sum_{r=0}^{n-1} A_r 2^r}{2^n-1}-\tfrac{1}{2}\right]$$

where $T=2^n-1$ and $n$=number of digits in the code group $(0 \leq X \leq 1)$.

Now, in FIG. 3, if $$G_r=\frac{1}{R2^{n-1}}$$

$R=100\Omega$, $n=7$, then $$E=\frac{\dfrac{1}{Rg+\dfrac{1}{AG_r}}E_0}{\dfrac{1}{Rg+\dfrac{1}{AG_r}}+\dfrac{1}{Rg+\dfrac{1}{2^{n-1}-NG_r}}}$$

Now if $$Y=2\left(\frac{E}{E_0}-\tfrac{1}{2}\right),\ (0 \leq Y \leq 1), \text{ and } m^2=1+\frac{2^n}{2^{n-1}}\frac{R}{Rg}$$

then $$Y=\frac{(m^2-1)X}{(m^2-X^2)}$$

Figure 4:
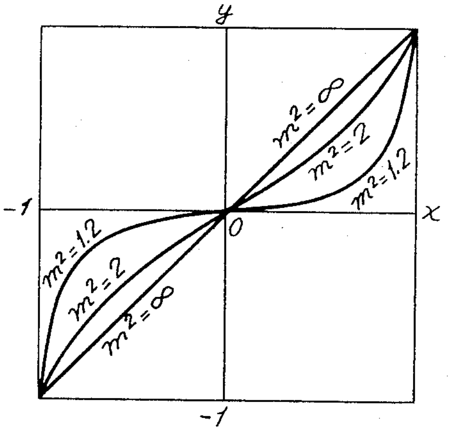
FIG. 4 shows typical input-output characteristics curves of a decoding circuit of FIGS. 3 and 5.

This characteristic is shown in FIG. 4.

As seen from the above, the XY expansion characteristic varies while retaining its symmetry relative to a zero point according to the value of *m*, which is determined by circuit constants. This characteristic does not change basically for any given load connected to the output terminal E of FIG. 3, and only the output level and value *m* are adjusted thereby. The network can be utilized as a non-linear expanding decoder and a pair of such networks can be used effectively for telephone PCM transmission devices as non-linear signal coder and decoder respectively, the former having a compression characteristic by using the network as a partial decoder of a feedback coder of the known type.

The circuit of FIG. 5 has a number of advantages compared to that of FIG. 1. First, the adjustment in actual use is simpler because the types of resistances are less. Secondly, in selecting the compression characteristics of FIG. 1 it is necessary to change the resistance R for each digit in order to change the value of R*g*. However, in FIG. 3, only a change of R*g* is necessary. Thirdly, symmetry is obtained with simple elements of the usual type such as flip-flops.

Figure 6:
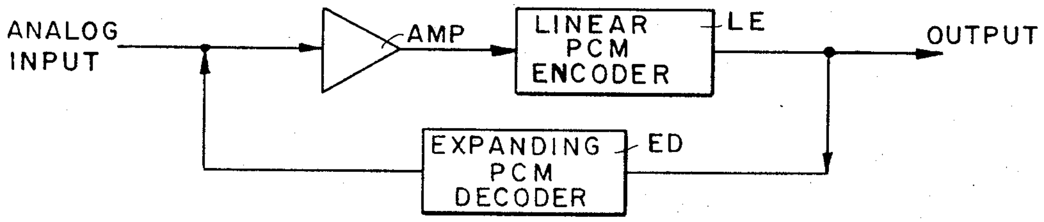
FIG. 6 is a block diagram of a non-linear coding circuit embodying features of the invention.

A compressor using the expander circuit of FIG. 5 is shown by the block diagram of FIG. 6. There an amplifier AMP passes the amplified analog input signal to a linear PCM encoder LE of the known type. The decoder ED is the one shown in FIG. 5, and provides a negative feedback to the amplifier AMP.

It will be obvious to those skilled in the art that the invention may be embodied other than by the construction described in detail herein.

We claim:

1. An expanding pulse-code-modulation decoder comprising two groups of parallel-connected resistances having values in geometric order to form groups of parallel branches, each branch of one group corresponding to a branch in the other and to a respective bit in a PCM code group, a pair of series resistors, a constant-voltage source, circuit means connecting said resistors and said groups in series across said constant voltage source to form a voltage divider having an output terminal between said two groups, switch means in each parallel branch, and series-to-parallel PCM input means for oppositely switching both switch means of each pair of switch means in corresponding branches of each group depending upon the respective code values of the bits in a pulse-code-modulated group.

2. An expanding pusle-code-modulation decoder comprising two groups of parallel-connected resistances having values in geometric order to form groups of parallel branches, each branch of one group corresponding to a branch in the other and to a respective bit in a PCM code group, the values of each resistance being $2^{n-1}$R where $n$=1, 2, 3 . . . a pair of series resistors, a constant-voltage source, circuit means connecting said resistors and said groups in series across said constant voltage source to form a voltage divider having an output terminal between said two groups, switch means in each parallel branch, and series-to-parallel PCM input means for oppositely switching both switch means of each pair of switch means in corresponding branches of each group depending upon the respective code values of the bits in a pulse-code-modulated group.

3. An expanding pulse-code-modulation decoder comprising two groups of parallel-connected resistances having values in geometric order to form groups of parallel branches, each branch of one group corresponding to a branch in the other and to a respective bit in a PCM code group, a pair of series resistors, a constant-voltage source, circuit means connecting said resistors and said groups in series across said constant voltage source to form a voltage divider having an output terminal between said two groups, switch means in each parallel branch, said circuit means connecting said resistor pair between said two groups and forming said output at the junction between said resistor pair, and series-to-parallel PCM input means for oppositely switching both switch means of each pair of switch means in corresponding branches of each group depending upon the respective code values of the bits in a pulse-code-modulated group.

4. An expanding pulse-code-modulation decoder comprising two groups of parallel-connected resistances having values in geometric order to form groups of parallel branches, each branch of one group corresponding to a branch in the other and to a respective bit in a PCM code group, a pair of series resistors, a constant-voltage source, circuit means connecting said resistors and said groups in series across said constant voltage source to form a voltage divider having an output terminal between said two groups, switch means in each parallel branch, PCM input means including shift register means for converting the successive PCM bits in each code group to simultaneous bits, and a plurality of flip-flop means each responding to respective bits in each group for oppositely switching the switch means in each corresponding branch pair.

References Cited

UNITED STATES PATENTS

| | | | |
|---|---|---|---|
| 2,889,409 | 6/1959 | Carbrey | 325—38 |
| 3,175,212 | 3/1965 | Miller | 325—38 X |

JOHN W. CALDWELL, *Primary Examiner.*

DAVID REDINBAUGH, *Examiner.*

J. T. STRATMAN, *Assistant Examiner.*